United States Patent
Naniwa (10) Patent No.: US 9,388,004 B2
(45) Date of Patent: Jul. 12, 2016

(54) SHEET FEEDER AND IMAGE READER HAVING THE SAME

(71) Applicant: BROTHER KOGYO KABUSHIKI KAISHA, Nagoya, Aich-ken (JP)

(72) Inventor: Takuya Naniwa, Kiyosu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/606,158

(22) Filed: Jan. 27, 2015

(65) Prior Publication Data

US 2015/0210491 A1    Jul. 30, 2015

(30) Foreign Application Priority Data

Jan. 30, 2014    (JP) .................................. 2014-015633

(51) Int. Cl.

| | |
|---|---|
| H04N 1/04 | (2006.01) |
| B65H 5/36 | (2006.01) |
| H04N 1/00 | (2006.01) |
| B65H 3/06 | (2006.01) |
| B65H 5/06 | (2006.01) |

(52) U.S. Cl.
CPC ................ *B65H 5/36* (2013.01); *B65H 3/0669* (2013.01); *B65H 5/062* (2013.01); *H04N 1/00588* (2013.01); *H04N 1/00602* (2013.01); *B65H 2402/61* (2013.01); *B65H 2404/16* (2013.01); *B65H 2404/17* (2013.01); *B65H 2801/39* (2013.01)

(58) Field of Classification Search
CPC . H04N 1/00588; H04N 1/00602; B65H 5/36; B65H 2404/16; B65H 2404/17
USPC .................................. 358/498, 497, 496, 474
See application file for complete search history.

(56) References Cited

U.S. PATENT DOCUMENTS

| | | | | |
|---|---|---|---|---|
| 5,594,486 | A | * | 1/1997 | Kiyohara ........................ 347/104 |
| 7,933,046 | B2 | * | 4/2011 | Silverbrook ........... B41J 2/0452 |
| | | | | 358/2.1 |
| 2006/0012112 | A1 | * | 1/2006 | Kitazawa ....................... 271/272 |

FOREIGN PATENT DOCUMENTS

| | | |
|---|---|---|
| JP | 2003-063671 A | 3/2003 |
| JP | 2004-142862 A | 5/2004 |
| JP | 2013-25097 A | 2/2013 |

* cited by examiner

*Primary Examiner* — Houshang Safaipour
(74) *Attorney, Agent, or Firm* — Merchant & Gould P.C.

(57) ABSTRACT

A sheet feeder including a motor, a shaft configured to be driven to rotate by a driving force from the motor, the shaft being spaced apart from the motor in an axial direction of the shaft, the shaft being disposed to overlap in a view in the axial direction of the shaft, and a roller supported by the shaft and rotatable along with the shaft, the roller being configured to convey the sheet downstream in a sheet conveyance direction along a sheet conveyance path.

18 Claims, 10 Drawing Sheets

SHEET FEEDER AND IMAGE READER HAVING THE SAME

CROSS-REFERENCE TO RELATED APPLICATION

This application claims priority under 35 U.S.C. §119 from Japanese Patent Application No. 2014-015633 filed on Jan. 30, 2014. The entire subject matter of the application is incorporated herein by reference.

BACKGROUND

1. Technical Field

The following description relates to aspects of a sheet feeder and an image reader having the sheet feeder.

2. Related Art

An automatic document feeder (hereinafter referred to as an "ADF" in an abbreviation form) of an image reader has been known that includes rotational shafts, motors configured to drive and rotate the rotational shafts, and rollers each configured to rotate together with a corresponding one of the rotational shafts and feed sheets downstream in a sheet feeding direction.

For instance, the known automatic document feeder includes a first motor, a pickup roller, a separation roller, a registration roller, and a turn-around roller. The pickup roller, the separation roller, the registration roller, and the turn-around roller are driven to rotate by the first motor. The automatic document feeder further includes a second motor, a pre-reading roller, a reading roller, a post-reading roller, and a discharge roller. The pre-reading roller, the reading roller, the post-reading roller, and the discharge roller are driven to rotate by the second motor. The first motor and the second motor are disposed not to overlap any of the aforementioned various rollers in a view in an axial direction of each roller.

SUMMARY

However, when the above elements such as the various rollers and the first and second motors are disposed based on the aforementioned positional relationship thereamong, it requires a large region occupied by the elements in the view in the axial direction of each roller. Consequently, the ADF as a whole needs to be large in size. Therefore, when the ADF is required to be made smaller or thinner, it might be impossible to apply the aforementioned positional relationship among the elements included in the ADF. Thus, it requires some ingenuity to achieve miniaturization of the ADF.

Aspects of the present disclosure are advantageous to provide one or more improved techniques for realizing an ADF smaller in size than the known ADF.

According to aspects of the present disclosure, a sheet feeder is provided, which includes a motor, a first shaft configured to be driven to rotate by a driving force from the motor, the first shaft being spaced apart from the motor in an axial direction of the first shaft, the first shaft being disposed to overlap in a view in the axial direction of the first shaft, and a first roller supported by the first shaft and rotatable along with the first shaft, the first roller being configured to convey the sheet downstream in a sheet conveyance direction along a sheet conveyance path.

According to aspects of the present disclosure, further provided is an image reader that includes an image sensor configured to read an image on a sheet in a reading position, and a sheet feeder configured to feed the sheet to the reading position and discharge the sheet on which the image has been read by the image sensor, the sheet feeder including a motor, a first shaft configured to be driven to rotate by a driving force from the motor, the first shaft being spaced apart from the motor in an axial direction of the first shaft, the first shaft being disposed to overlap in a view in the axial direction of the first shaft, and a first roller supported by the first shaft and rotatable along with the first shaft, the first roller being configured to convey the sheet downstream in a sheet conveyance direction along a sheet conveyance path.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, a multi-function peripheral 1 (hereinafter referred to as an "MFP 1") of an illustrative embodiment according to aspects of the present disclosure will be described with reference to the accompanying drawings. In the following description, a vertical direction, a left-to-right direction, and a front-to-rear direction of the MFP will be defined as shown in the accompanying drawings, for the sake of simple explanations on relative positional relationship among elements included in the MFP 1.

[Configuration of MFP]

Figure 1:
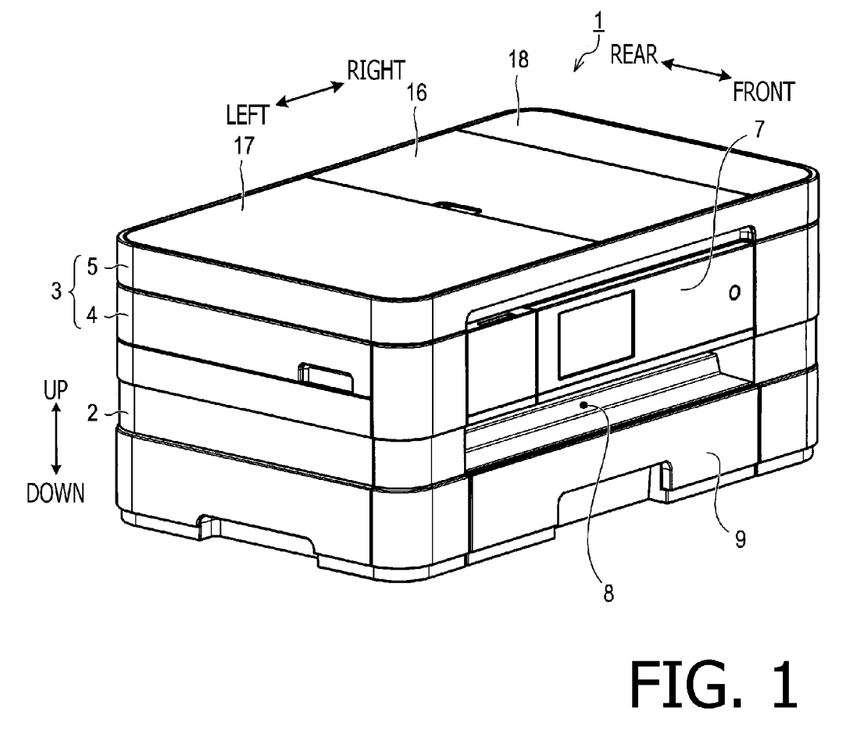
FIG. 1 is a perspective view of a multi-function peripheral (hereinafter, which may be referred to as an MFP in an abbreviation form) in an illustrative embodiment according to one or more aspects of the present disclosure.

The MFP 1 includes a main body unit 2 and a reading unit 3 disposed above the main body unit 2. The reading unit 3 is attached to the main body unit 2 to be openable and closable relative to the main body unit 2. When the reading unit 3 is closed, an opening formed at an upper face side of the main body unit 2 is closed by the reading unit 3.

The reading unit 3 includes a flatbed section 4 (hereinafter referred to as an "FB section 4") and an ADF section 5 disposed above the FB section 4. The ADF section 5 is attached to the FB section 4 to be openable and closable relative to the FB section 4. When the ADF section 5 is closed, the ADF section 5 serves as a cover for covering an upper face side of the FB section 4.

Inside the main body unit 2, a controller, an image forming section, and an LAN communication section are disposed. Further, an operation panel 7 is disposed at an upper front portion of the main body unit 2. The operation panel 7 is configured to be operated by a user. At a lower portion of the operation panel 7, an output port 8 is disposed. The output port 8 is configured to discharge therethrough a recording medium (such as a recording sheet) on which an image has been formed by the image forming section. Namely, the user is allowed to take out the recording medium with the image formed thereon from the output port 8. Below the output port 8, a medium supply cassette 9 is attached. The medium supply cassette 9 is configured to accommodate recording media (such as recording sheets) to be supplied to the image forming section.

Figure 2A:
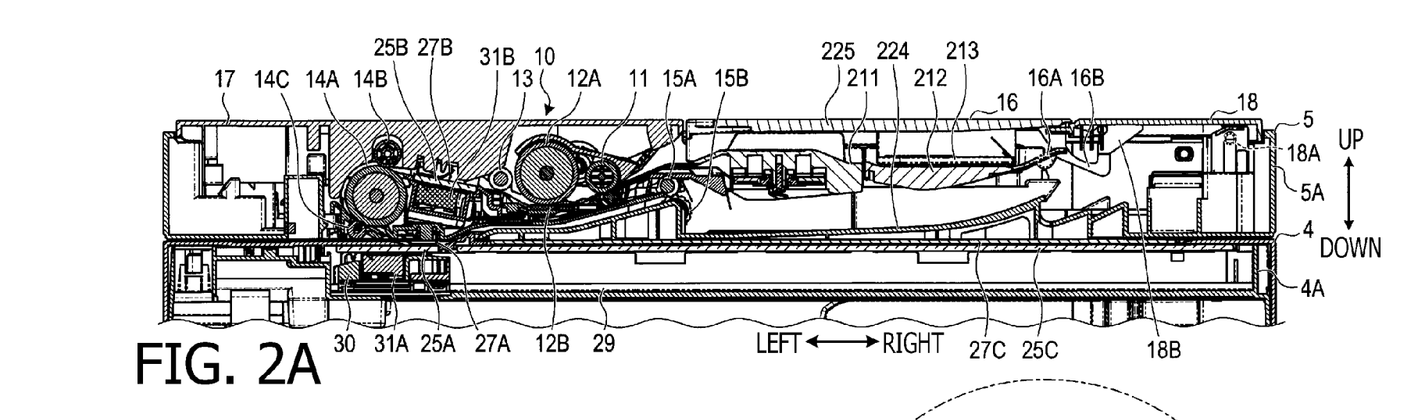
FIG. 2A is a cross-sectional front view showing an internal configuration of a reading unit of the MFP in a state where a first cover is closed, in the illustrative embodiment according to one or more aspects of the present disclosure.
Figure 2B:
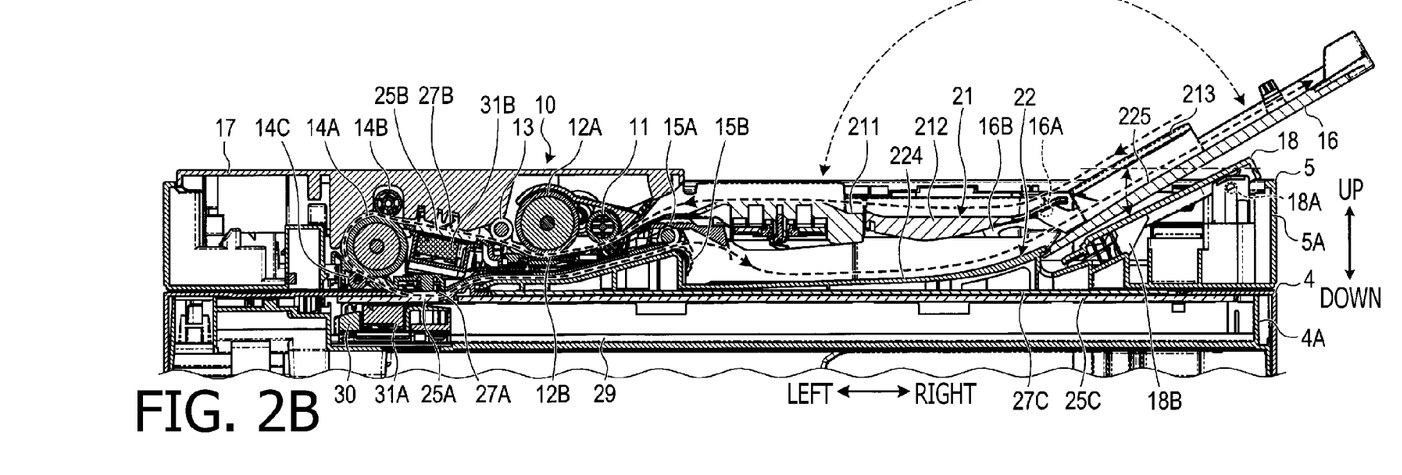
FIG. 2B is a cross-sectional front view showing an internal configuration of the reading unit of the MFP in a state where the first cover is open, in the illustrative embodiment according to one or more aspects of the present disclosure.

In the reading unit 3, as shown in FIGS. 2A and 2B, the ADF section 5 includes a sheet conveyor 10 configured to convey document sheets along a sheet conveyance path (see a bold dashed arrow in FIG. 2B). The sheet conveyor 10 includes a pickup roller 11, a separation roller 12A, a separation pad 12B, a relay roller 13, a turn-around roller 14A, an upper pinch roller 14B, a lower pinch roller 14C, a discharge roller 15A, and a discharge pinch roller 15B.

As shown in FIGS. 1, 2A, and 2B, there are a first cover 16, a second cover 17, and a third cover 18 disposed at an upper face side of the ADF section 5. The first cover 16, the second cover 17, and the third cover 18, together with an ADF base member 5A, form an exterior of the ADF section 5. The ADF base member 5A forms a bottom portion and side walls of the ADF section 5.

The first cover 16 is configured to rotate around a rotational shaft 16A, between a retracted position shown in FIG. 2A and a usage position shown in FIG. 2B. The rotational shaft 16A is disposed close to a right end portion of the first cover 16 in the retracted position. The third cover 18 is configured to rotate around a rotational shaft 18A, between a horizontal position shown in FIG. 2A and a slanted position shown in FIG. 2B. The rotational shaft 18A is disposed close to a right end portion of the third cover 18.

In the state shown in FIG. 2A, a boss (not shown), which is disposed at a distal end of an arm 16B extending from the first cover 16, is inserted into an arm receiver 18B that is formed on a lower surface of the third cover 18. Thus, the boss supports the third cover 18 from underneath. Namely, in the state shown in FIG. 2A, as the arm 16B extending from the first cover 16 supports the third cover 18 from underneath, the first cover 16 and the third cover 18 forms a horizontal surface. It is noted that the "horizontal surface" means not only a completely horizontal plane surface but also a substantially horizontal surface that may include some concave and convex portions and some slanted portions. Then, in this state, when the first cover is rotated from the retracted position to the usage position, the boss of the arm 16B moves downward, and a left end portion of the third cover 18 moves downward. Thereby, the third cover 18 is rotated from the horizontal position shown in FIG. 2A to the slanted position shown in FIG. 2B, in conjunction with rotation of the first cover 16.

When the first cover 16 moves from the retracted position to the usage position, the third cover 18 reaches the slanted position before the first cover 16 reaches the usage position. After that, the boss of the arm 16B gets out of the arm receiver 18B, and the first cover 16 reaches the usage position without displacing the third cover 18 (i.e., with maintaining the slanted position of the third cover 18). Further, when moving from the usage position to the retracted position, initially, the first cover 16 rotates without displacing the third cover 18. Nevertheless, the boss of the arm 16B is inserted into the arm receiver 18B before the first cover 16 reaches the retracted position. After that, thereby, the boss of the arm 16B lifts up the left end portion of the third cover 18 until the first cover 16 reaches the retracted position. Thus, the third cover 18 rotates in conjunction with rotation of the first cover 16, and reaches the horizontal position substantially at the same time when the first cover 16 reaches the retracted position.

When the first cover 16 moves to the usage position, a first supporter 21 and a second supporter 22 are formed at the ADF section 5. The first supporter 21 is configured to support, from underneath, document sheets to be supplied to the sheet conveyor 10. The second supporter 22 is configured to support, from underneath, the document sheets discharged from the sheet conveyor 10. The first supporter 21 and the second supporter 22 are disposed to at least partially overlap each other in a view in the vertical direction. Further, the first supporter 21 and the second supporter 22 are spaced apart from each other in the vertical direction. The first supporter 21 is positioned above the second supporter 22 (i.e., the second supporter 22 is positioned below the first supporter 21).

As shown in FIGS. 2A and 2B, the first supporter 21 includes a first tray 211, a second tray 212, and a third tray 213. The first tray 211 is configured to support the document sheets in a position closer to the sheet conveyor 10 than the second tray 212 and the third tray 213. The second tray 212 is configured to support the document sheets in a position farther from the sheet conveyor 10 than the first tray 211. The third tray 213 is configured to support the document sheets in a position farther from the sheet conveyor 10 than the second tray 212. The second supporter 22 includes a fourth tray 224 and a fifth tray 225. The fourth tray 224 is configured to support the document sheets in a position closer to the sheet conveyor 10 than the fifth tray 225. The fifth tray 225 is configured to support the document sheets in a position farther from the sheet conveyor 10 than the fourth tray 224. The fifth tray 225 is formed by a surface of the first cover 16. The third tray 213 is fixedly attached to the surface of the first cover 16, to be spaced apart from the fifth tray 225. Therefore, when the first cover 16 is in the usage position, the third tray 213 is disposed in a position where the third tray 213 forms a part of the first supporter 21, and the fifth tray 225 is disposed in a position where the fifth tray 225 forms a part of the second supporter 22. When the first cover 16 is moved to the retracted position, the first cover 16 is placed into a state to cover upper sides of the first tray 211 and the second tray 212. At this time, the other surface of the first cover 16 faces upward. The third tray 213 and the fifth tray 225, which have moved along with movement of the first cover 16 to the retracted position, are put inside the ADF section 5 in a state where sheet supporting surfaces of the trays 213 and 225 are oriented to face downward.

Document sheets placed on the first supporter 21 is conveyed along the sheet conveyance path indicated by the bold dashed arrow in FIG. 2B, and discharged onto the second supporter 22. At that time, the document sheets, fed downstream from the first supporter 21 in a sheet conveyance direction by the pickup roller 11, are separated on a sheet-by-sheet basis by the separation roller 12A and the separation pad 12B. Then, the document sheets are further conveyed downstream in the sheet conveyance direction by the relay roller 13 and the turn-around roller 15A, and discharged onto the second supporter 22 by the discharge roller 15A.

A first transparent portion 25A and a first document pressing member 27A are disposed in a position between the turn-around roller 14A and the discharge roller 15A, along the sheet conveyance path. Further, a second transparent portion 25B and a second document pressing member 27B are disposed in a position between the relay roller 13 and the turn-around roller 14A, along the sheet conveyance path.

The first transparent portion 25A is disposed in the FB section 4. The second transparent portion 25B, the first document pressing member 27A, and the second document pressing member 27B are disposed in the ADF section 5. In the present embodiment, each of the first transparent portion 25A and the second transparent portion 25B is formed by a glass plate. Each of the first transparent portion 25A and the second transparent portion 25B extends over a range more than a length of the document sheets in a width direction (i.e., the front-to-rear direction) perpendicular to the sheet conveyance direction.

Each of the first document pressing member 27A and the second document pressing member 27B is made of metal or hard resin material. Each of the first document pressing member 27A and the second document pressing member 27B extends over a range more than the length of the document sheets in the width direction, in the same manner as the first transparent portion 25A and the second transparent portion 25B.

The first document pressing member 27A is urged toward the first transparent portion 25A by a spring (not shown). Thereby, the first document pressing member 27A prevents a document sheet, which is passing over the first transparent portion 25A while contacting an upper surface of the first transparent portion 25A, from floating from the first transparent portion 25A. The second document pressing member 27B is urged toward the second transparent portion 25B by a spring (not shown). Thereby, the second document pressing member 27B prevents a document sheet, which is passing over the second transparent portion 25B while contacting an upper surface of the second transparent portion 25B, from floating from the second transparent portion 25B.

In addition, there is a third transparent portion 25C disposed in the FB section 4. Further, there is a third document pressing member 27C disposed in the ADF section 5. The third transparent portion 25C is formed by a glass plate, in the same manner as the first transparent portion 25A and the second transparent portion 25B. However, the third transparent portion 25C is different from the first transparent portion 25A and the second transparent portion 25B in the following point. That is, the third transparent portion 25C has an area wide enough for a document sheet to be entirely put thereon.

The third document pressing member 27C is formed by a laminated body that includes a formed resin layer and a hard resin film layer. When the ADF section 5 is closed, the third document pressing member 27C comes into close contact with the third transparent portion 25C while being slightly and elastically deformed. Thereby, the third document pressing member 27C prevents a document sheet placed on the third transparent portion 25C from floating from the third transparent portion 25C.

In the FB section 4, a guiderail 29, a carriage 30, and a first image sensor 31A are disposed. In the ADF section 5, a second image sensor 31B is disposed. The guiderail 29 is formed integrally on an inner surface of a bottom portion of a housing 4A of the FB section 4. The guiderail 29 extends in the left-to-right direction, parallel to lower surfaces of the first transparent portion 25A and the third transparent portion 25C, over a range from a position under the first transparent portion 25A to a position under the third transparent portion 25C.

The carriage 30 is attached to an upper portion of the guiderail 29. Thereby, the carriage 30 is supported to reciprocate along the guiderail 29 in the left-to-right direction. The carriage 30 is connected with a timing belt (not shown). The carriage 30 reciprocates along the left-to-right direction in response to the timing belt being driven to revolve.

In the illustrative embodiment, as each of the first image sensor 31A and the second image sensor 31B, a contact image sensor (hereinafter referred to as a "CIS" in an abbreviation form) is used. The first image sensor 31A is mounted on the carriage 30, and configured to reciprocate along the left-to-right direction together with the carriage 30.

There is a spring (not shown) disposed between the first image sensor 31A and the carriage 30. The first image sensor 31A is urged upward by the spring. Further, a spacer is attached to each of two end portions of the first image sensor 31A in the front-to-rear direction. The spacers, urged upward together with the first image sensor 31A, are configured to contact the lower surface of the third transparent portion 25C or the lower surface of the first transparent portion 25A.

Thereby, when the first image sensor 31A reciprocates along the left-to-right direction together with the carriage 30, the spacers maintains a contact state where the spacers are in contact with the lower surface of the third transparent portion 25C or the lower surface of the first transparent portion 25A. Thus, the first image sensor 31A moves while maintaining a constant distance from the third transparent portion 25C and the first transparent portion 25A in the vertical direction.

The second image sensor 31B is unmovably disposed in a predetermined position. The second image sensor 31B is urged toward the second transparent portion 25B by a spring (not shown). Thereby, a distance between the second image sensor 31B and the second transparent portion 25B is maintained constant.

Each of the first image sensor 31A and the second image sensor 31B has a plurality of reading elements arranged in the front-to-rear direction. When reading an image of a document sheet placed on an upper surface of the third transparent portion 25C, the first image sensor 31A reads the image while moving along with the carriage 30.

Further, when reading images of a document sheet being conveyed by the sheet conveyor 10, the first image sensor 31A reads an image on a side of the document sheet passing over and in contact with an upper surface of the first transparent portion 25A, in a static state where the first image sensor 31A is staying in a position under the first document pressing member 27A and the first transparent portion 25A. The second image sensor 31B reads an image on the other side of the document sheet passing over and in contact with an upper surface of the second transparent portion 25B, in a position under the second document pressing member 27B and the second transparent portion 25B.

[Detailed Configuration of Sheet Conveyor]

Figure 3:
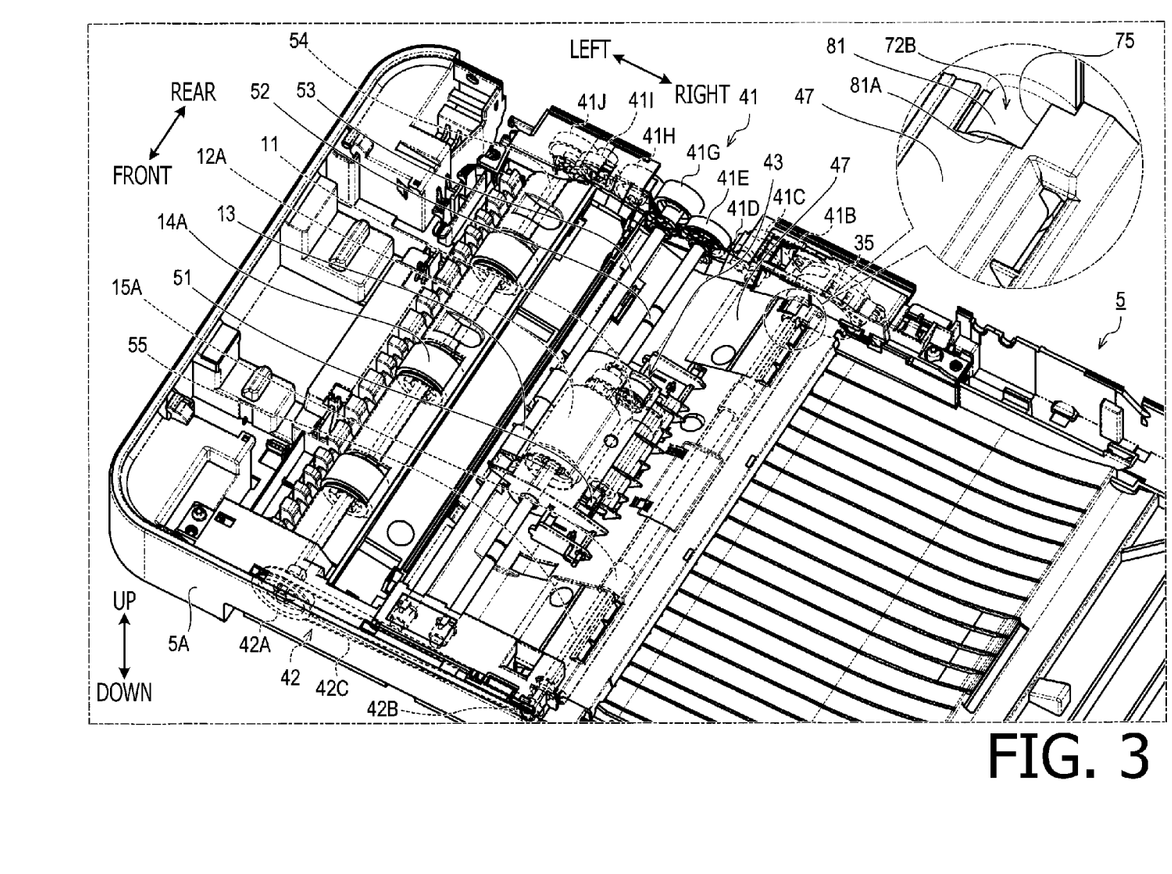
FIG. 3 is a perspective view showing a configuration around an ADF section of the reading unit to which a second guide member is attached, in the illustrative embodiment according to one or more aspects of the present disclosure.
Figure 4:
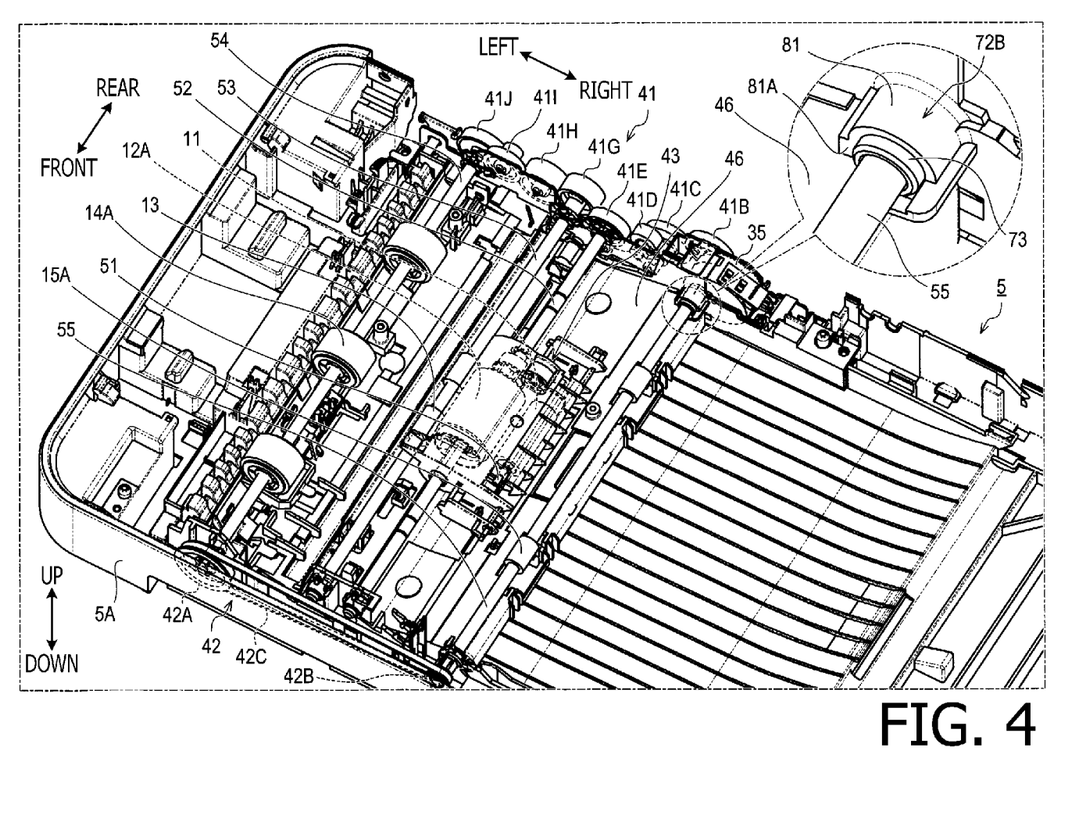
FIG. 4 is a perspective view showing a configuration around the ADF section of the reading unit from which the second guide member is removed, in the illustrative embodiment according to one or more aspects of the present disclosure.
Figure 5:
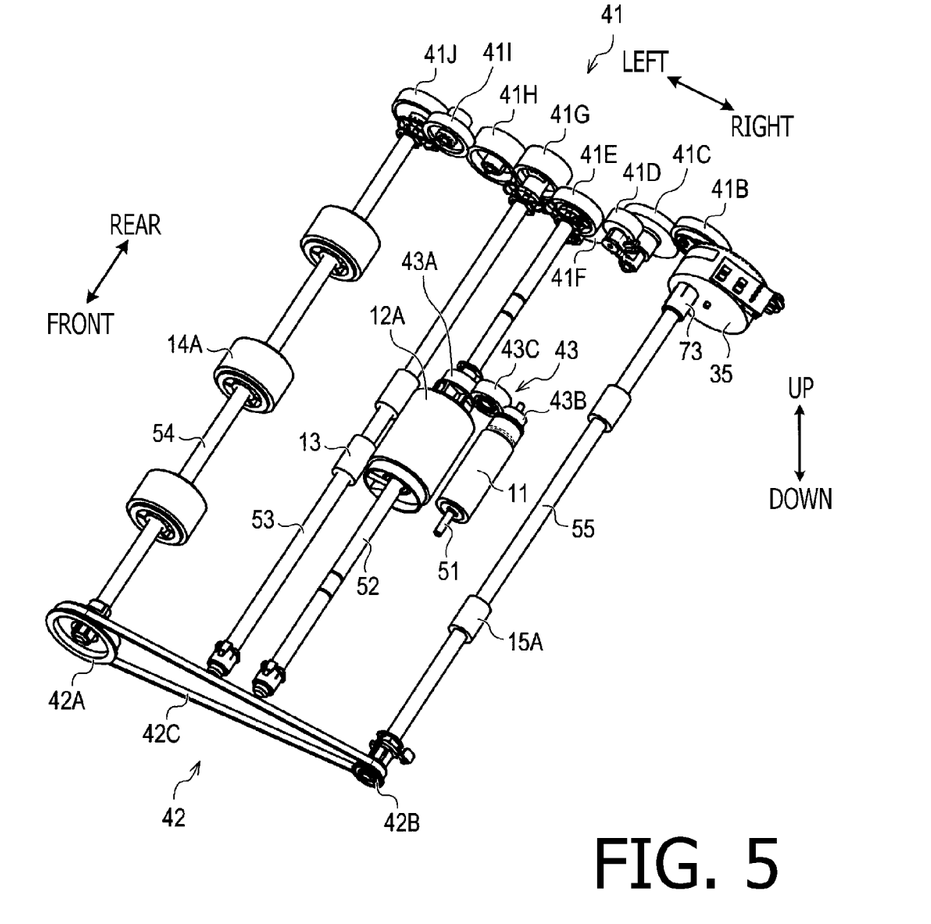
FIG. 5 is a perspective view showing a motor, rollers to be driven by a driving force from the motor, and power transmission units for transmitting the driving force from the motor to the rollers in the illustrative embodiment according to one or more aspects of the present disclosure.
Figure 6:
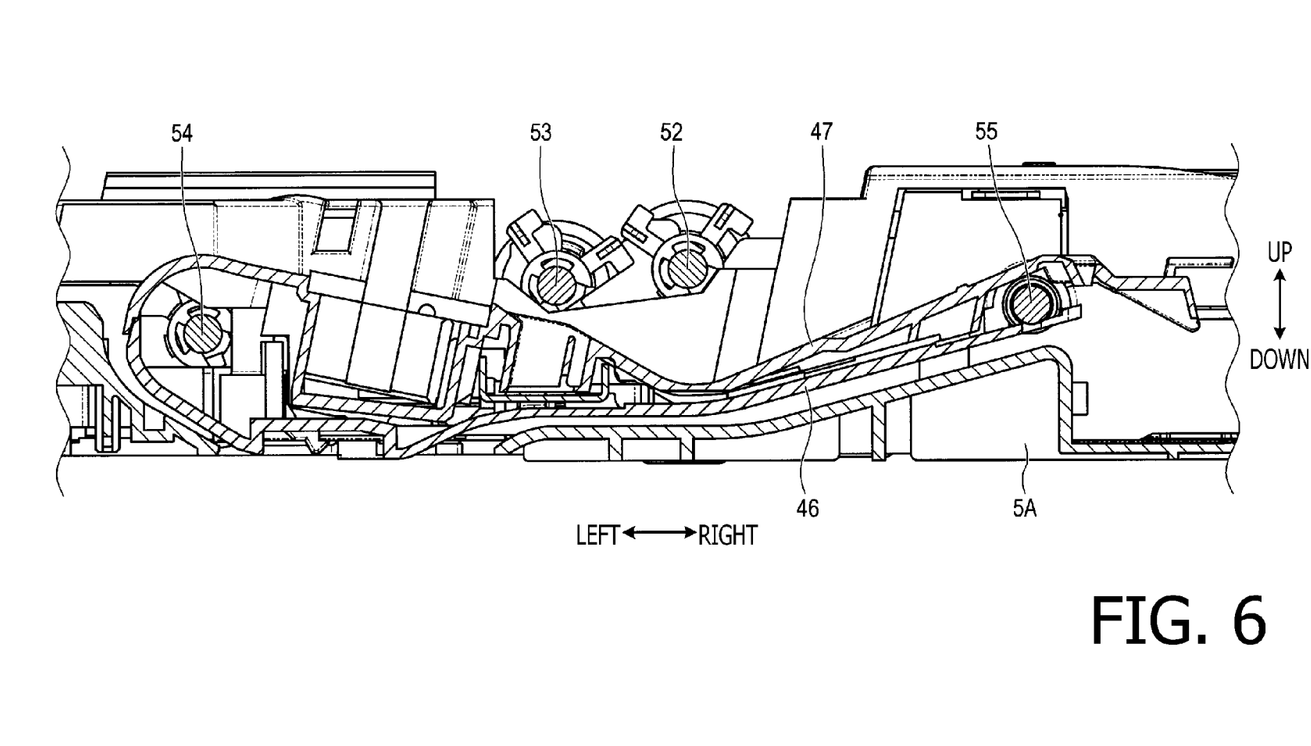
FIG. 6 is a cross-sectional front view showing a configuration around a first guide member and the second guide member in the illustrative embodiment according to one or more aspects of the present disclosure.

Subsequently, a detailed explanation will be provided about a configuration of the sheet conveyor 10. In order to drive and rotate the pickup roller 11, the separation roller 12A, the relay roller 13, the turn-around roller 14A, and the discharge roller 15A, as shown in FIGS. 3 to 5, the sheet conveyor 10 includes a first power transmission unit 41, a second power transmission unit 42, and a third power transmission unit 43. The first power transmission unit 41, the second power transmission unit 42, and the third power transmission unit 43 are disposed on an upper surface side of the ADF base member 5A. Further, as shown in FIGS. 3, 4, and 6, a first guide member 46 and a second guide member 47 are disposed on the upper surface side of the ADF base member 5A.

FIG. 4 shows a state in which the second guide member 47 shown in FIG. 3 is removed. Thus, in FIG. 4, it is possible to see elements that are hidden under the second guide member 47 and invisible in FIG. 3. In FIG. 5, elements, which are shown in FIG. 4 and other than the sheet conveyor 10, are omitted. Thus, in FIG. 5, it is possible to see elements that are hidden under the first guide member 46 and invisible in FIG. 4.

The first guide member 46 and the second guide member 47 are members for defining the sheet conveyance path (see the bold dashed arrow in FIG. 2B). Specifically, the first guide member 46 is configured to, when attached to the ADF base member 5A, form (define) a downstream sheet conveyance path between the first guide member 46 and the ADF base member 5A. The downstream sheet conveyance path leads to the discharge roller 15A from the turn-around roller 14A. The second guide member 47 is disposed in a position that is opposite to the downstream sheet conveyance path with respect to the first guide member 46. The second guide member 47 is configured to form an upstream sheet conveyance path between the second guide member 47 and the second cover 17 that is disposed opposite to the first guide member 46 with respect to the second guide member 47. The upstream sheet conveyance path leads to the turn-around roller 14 from an upstream position relative to the turn-around roller 14A in the sheet conveyance direction. Namely, around the sheet conveyor 10, the sheet conveyance path passes over an upper surface side of the second guide member 47, and reaches a left end portion of the second guide member 47. Thereafter, the sheet conveyance path turns downward, then passes under a lower surface side of the first guide member 46, and reaches a right end portion of the first guide member 46.

Figure 7A:
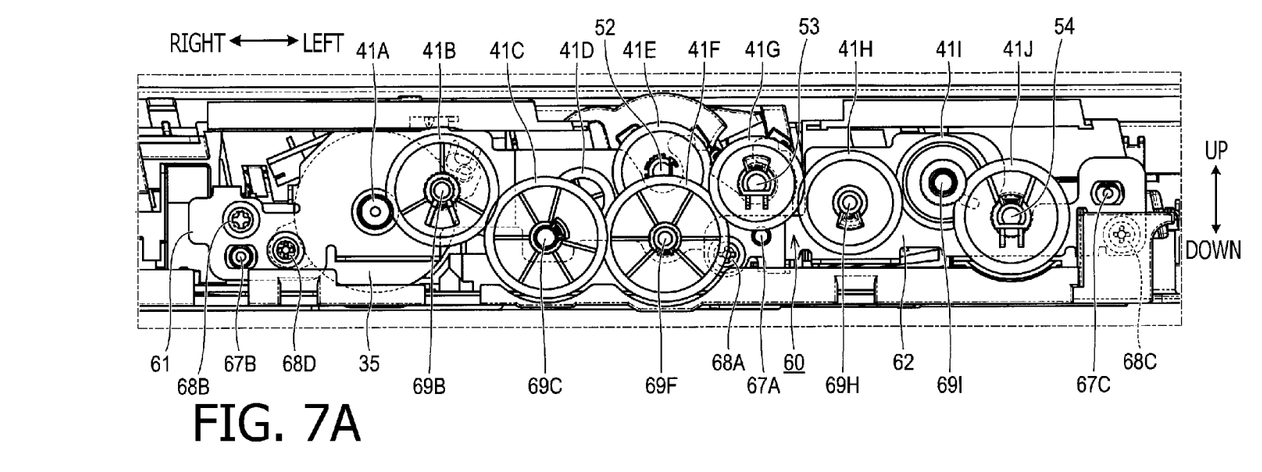
FIG. 7A is a rear view showing a first power transmission unit in the illustrative embodiment according to one or more aspects of the present disclosure.

The pickup roller 11, the separation roller 12A, the relay roller 13, the turn-around roller 14A, and the discharge roller 15A are fixedly attached to a shaft 51, a shaft 52, a shaft 53, a shaft 54, and a shaft 55, respectively. As shown in FIGS. 5 and 7A, gears 41E, 41G, and 41J, of gears 41A to 41J included in the first power transmission unit 41, are fixedly attached to rear end portions of the shafts 52, 53, and 54, respectively. When the first power transmission unit 41 operates in response to an operation of a motor 35, the gears 41E, 41G, and 41J rotates, and thereby, the shafts 52, 53, and 54 are driven to rotate.

Figure 7B:
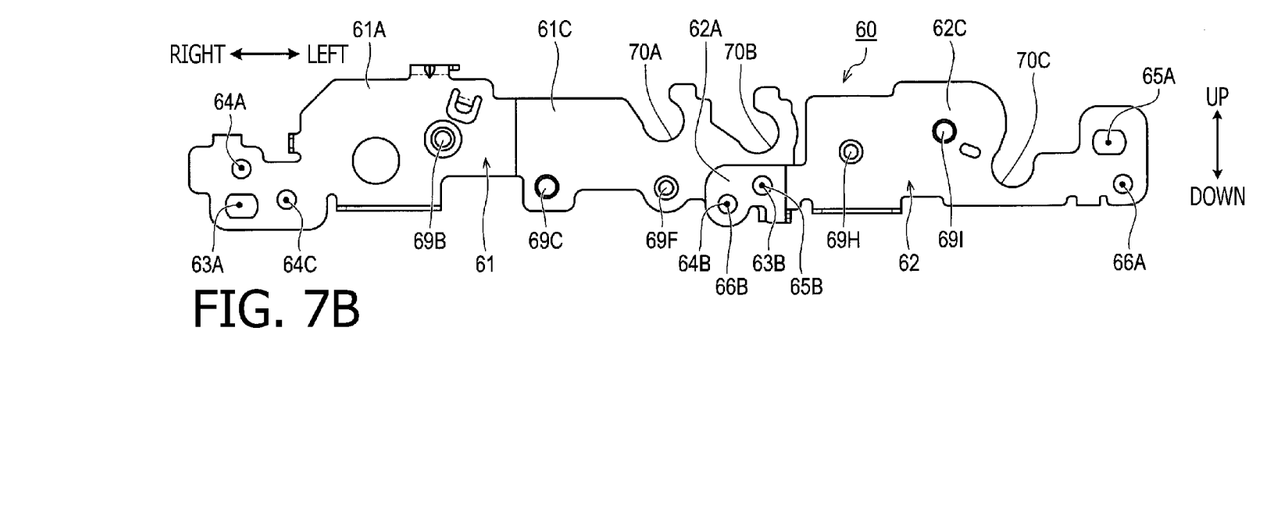
FIG. 7B is a rear view showing a supporting wall including a first sheet metal member and a second sheet metal member in the illustrative embodiment according to one or more aspects of the present disclosure.
Figure 8A:
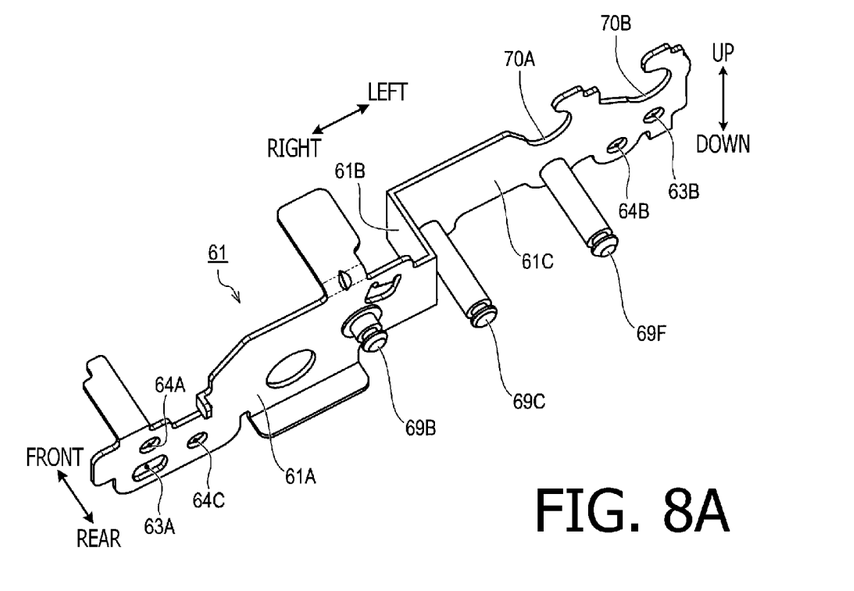
FIG. 8A is a perspective view showing the first sheet metal member in the illustrative embodiment according to one or more aspects of the present disclosure.
Figure 8B:
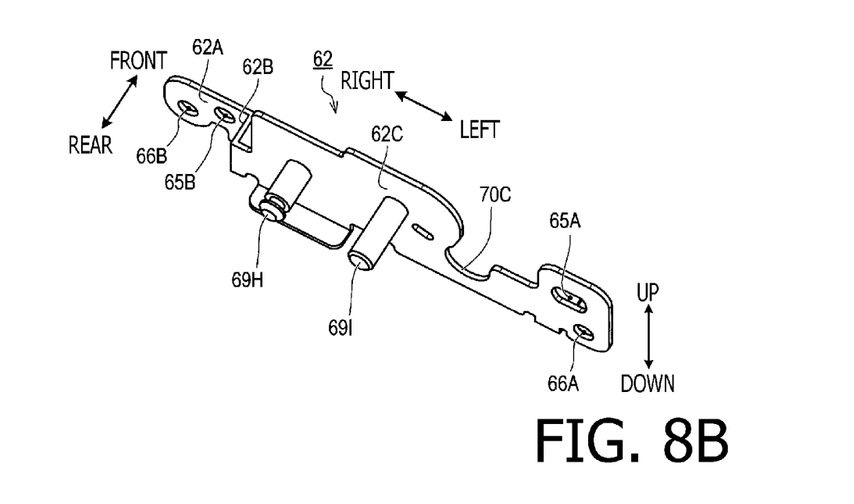
FIG. 8B is a perspective view showing the second sheet metal member in the illustrative embodiment according to one or more aspects of the present disclosure.

As shown in FIGS. 7A and 7B, around the first power transmission unit 41, a supporting wall 60 is disposed. As shown in FIGS. 7B, 8A, and 8B, the supporting wall 60 includes a first sheet metal member 61 and a second sheet metal member 62. The first sheet metal member 61 and the second sheet metal member 62 are sheet metal components.

The first sheet metal member 61 includes a first portion 61A, a second portion 61B, and a third portion 61C. The first portion 61A is a portion disposed parallel to the sheet conveyance path in a state where a plate thickness direction of the first portion 61A is oriented in the same direction as an axial direction of the shaft 55. The second portion 61B is a portion that is bent from a left end of the first portion 61A and extends in such a direction as to approach the sheet conveyance path. The third portion 61C is a portion that is bent from a front end of the second portion 61B and disposed parallel to the sheet conveyance path in a position closer to the sheet conveyance path than the first portion 61A in the front-to-rear direction.

The second sheet metal member 62 includes a fourth portion 62A, a fifth portion 62B, and a sixth portion 62C. The fourth portion 62A is a portion disposed parallel to the sheet conveyance path in a state where a plate thickness direction of the fourth portion 62A is oriented in the same direction as an axial direction of the shaft 55. The fifth portion 62B is a portion that is bent from a left end of the fourth portion 62A and extends in such a direction as to become farther from the sheet conveyance path. The sixth portion 62C is a portion that is bent from a rear end of the fifth portion 62B and disposed parallel to the sheet conveyance path in a position farther from the sheet conveyance path than the fourth portion 62A in the front-to-rear direction.

As shown in FIG. 7B, the first sheet metal member 61 has positioning holes 63A and 63B, and screw holes 64A and 64B. The second sheet metal member 62 has positioning holes 65A and 65B, and screw holes 66A and 66B.

The first sheet metal member 61 and the second sheet metal member 62 are fixedly attached to the first guide member 46 with high accuracy. Specifically, the third portion 61C and the fourth portion 62A are disposed to face and contact each other in their plate thickness direction. Then, the positioning hole 63B of the first sheet metal member 61 and the positioning hole 65B of the second sheet metal member 62 are positioned to coincide with each other, and a positioning projection 67A is inserted into the positioning holes 63B and 65B, as shown in FIG. 7A. The positioning projection 67A is formed to protrude from a surface of the first guide member 46. The screw hole 64B of the first sheet metal member 61 and the screw hole 66B of the second sheet metal member 62 are positioned to coincide with each other, and a screw 68A is inserted through the screw holes 64B and 66B. Then, the screw 68A is screwed into the first guide member 46.

Into the positioning hole 63A of the first sheet metal member 61, a positioning projection 67B is inserted. The positioning projection 67B is formed to protrude from a surface of the first guide member 46. A screw 68B is inserted through the screw hole 64A of the first sheet metal member 61, and then screwed into the first guide member 46. Into the positioning hole 65A of the second sheet metal member 62, a positioning projection 67C is inserted. The positioning projection 67C is formed to protrude from the surface of the first guide member 46. A screw 68C is inserted through the screw hole 66A of the second sheet metal member 61, and then screwed into the first guide member 46.

Thus, the first sheet metal member 61 is positioned relative to the first guide member 46, on the basis of the two positioning holes 63A and 63B. Further, the first sheet metal member 61 is screwed to the first guide member 46, through the two screw holes 64A and 64B. Likewise, the second sheet metal member 62 is positioned relative to the first guide member 46, on the basis of the two positioning holes 65A and 65B. Further, the second sheet metal member 62 is screwed to the first guide member 46, through the two screw holes 66A and 66B. Moreover, the positioning projection 67A is used in common to be inserted into both the positioning hole 63B of the first sheet metal member 61 and the positioning hole 65B of the second sheet metal member 62. Further, the screw 68A is used in common to be inserted through both the screw hole 64B of the first sheet metal member 61 and the positioning hole 66B of the second sheet metal member 62. Therefore, it is possible to accurately position the first sheet metal member 61 and the second sheet metal member 62 relative to the first guide member 46, and to accurately position the first sheet metal member 61 and the second sheet metal member 62 relative to each other.

The motor 35 is disposed on a surface of the first portion 61A that is close to the sheet conveyance path (i.e., a frontward-facing surface of the first portion 61A that faces the front side of the MFP 1. The motor 35 is fixedly attached to the first portion 61A by a screw 68D inserted through a screw hole 64C. Further, as shown in FIGS. 7A, 8A, and 8B, a shaft 69B is disposed on a rearward-facing surface of the first portion 61A (which faces the rear side of the MFP 1 and is opposite to the frontward-facing surface of the first portion 61A). Further, a shaft 69C and a shaft 69F are disposed on a rearward-facing surface of the third portion 61C. Further, a shaft 69H and a shaft 69I are disposed on a rearward-facing surface of the sixth portion 62C. To the shafts 69B, 69C, 69F, 69H, and 69I, gears 41B, 41C, 41F, 41H, and 41I are attached, respectively. Thus, each of the gears 41B, 41C, 41F, 41H, and 41I is supported to be rotatable around an axis extending in the front-to-rear direction. It is noted that the gears 41B, 41C, 41F, 41H, and 41I are included in the first power transmission unit 41.

The third portion 61C includes bearings 70A and 70B each formed in a cutout shape. The sixth portion 62C includes a bearing 70C formed in a cutout shape. Rear end portions of the shafts 52, 53, and 54 are supported by the bearings 70A, 70B, and 70C (see FIG. 7B) via bushes (with no reference characters shown), respectively. Thereby, the shafts 52, 53, and 54 are supported to be rotatable around axes extending in the front-to-rear direction, respectively.

Figure 9:
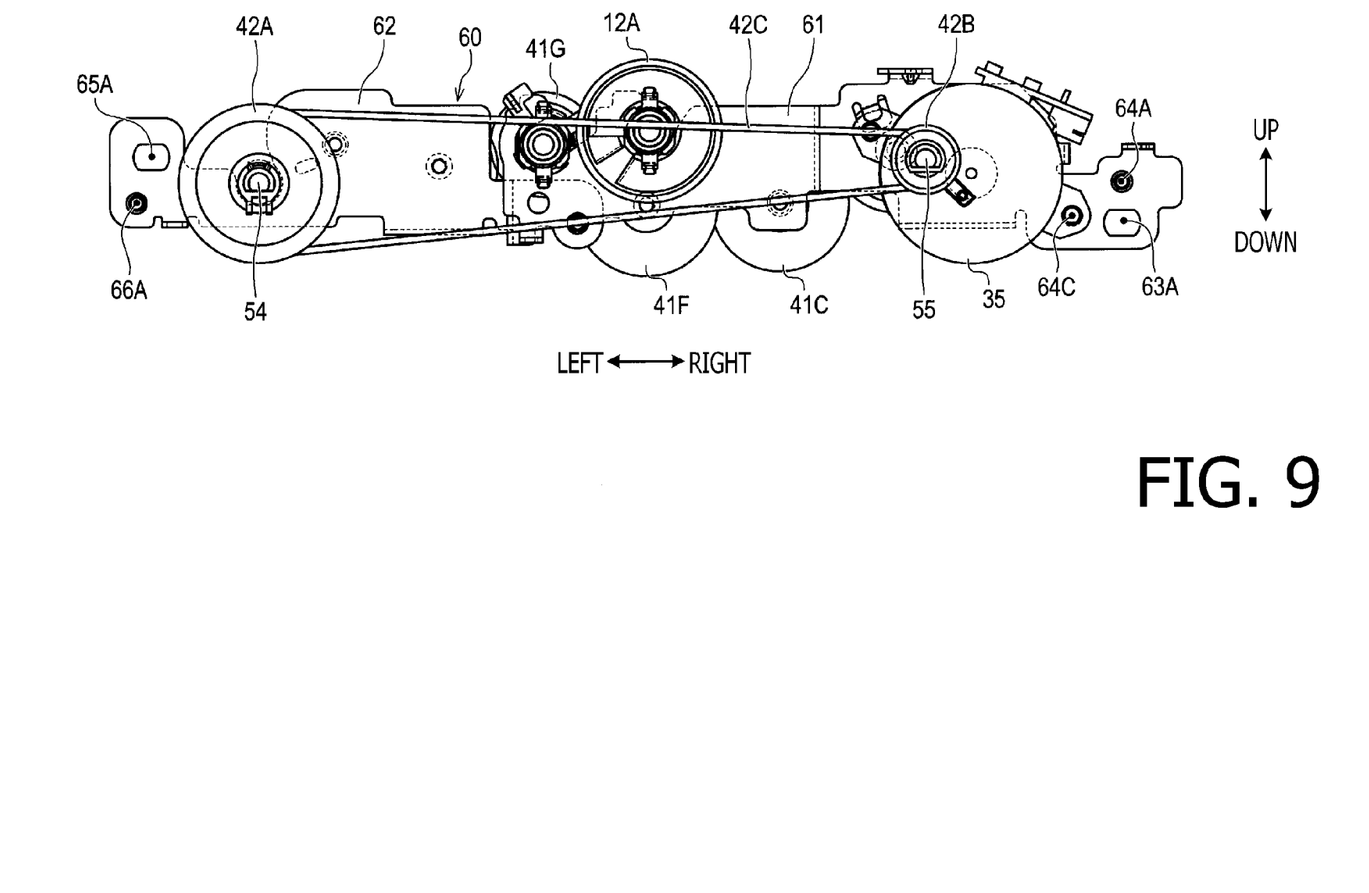
FIG. 9 is a front view showing a second power transmission unit, and the motor, the supporting wall, and the first power transmission unit behind the second power transmission unit in the illustrative embodiment according to one or more aspects of the present disclosure.

As shown in FIG. 9, the second power transmission unit 42 is disposed to overlap the first power transmission unit 41 in a view in an axial direction of the shafts 54 and 55. Further, the motor 35 and the shaft 55 are disposed to overlap each other in a view in the axial direction of the shaft 55. As shown in FIGS. 5 and 9, to front end portions of the shafts 54 and 55, gears 42A and 42B are attached. The gears 42A and 42B are included in the second power transmission unit 42. There is a toothed belt 42C wound around the gears 42A and 42B. When the first power transmission unit 41 operates in response to the operation of the motor 35, and thereby, the shaft 54 is driven to rotate, the second power transmission unit 42 operates. Specifically, in response to rotation of the gear 42A, the toothed belt 42C is driven to revolve, and the gear 42 is rotated. Thereby, the shaft 55 is driven to rotate. At this time, the shaft 55 is driven to rotate by the toothed belt 42C, in the same rotational direction as the shaft 54.

Figure 10:
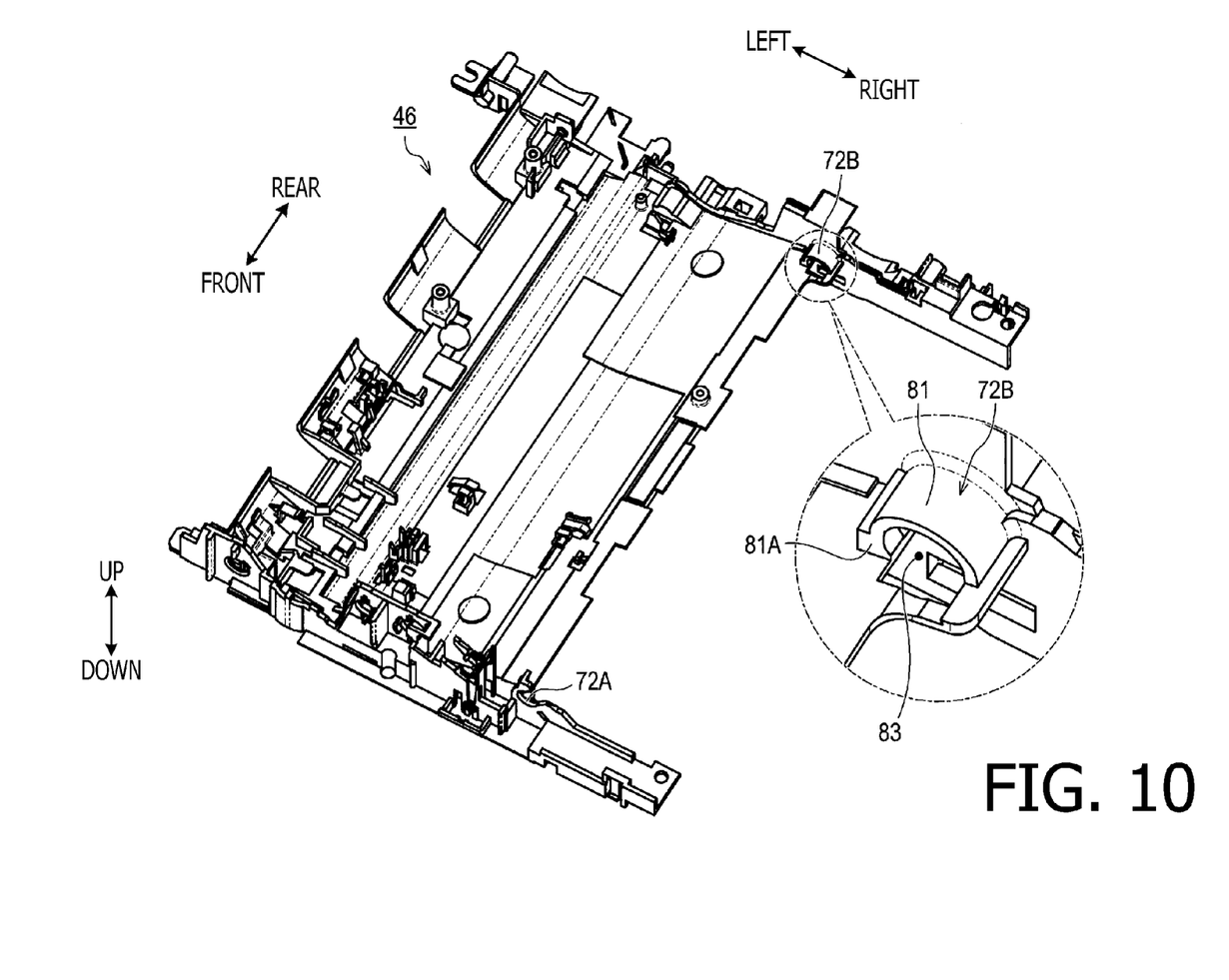
FIG. 10 is a perspective view showing the first guide member in the illustrative embodiment according to one or more aspects of the present disclosure.

As shown in FIGS. 4 and 10, the shaft 55 is attached to bearings 72A and 72B, and rotatably supported by the bearings 72A and 72B. The bearings 72A and 72B are formed integrally with the first guide member 46. The bearing 72B, which supports a rear end portion of the shaft 55, is disposed closer to the sheet conveyance path than the motor 35 in the front-to-rear direction. The motor 35 and the shaft 55 are spaced apart from each other in the axial direction of the shaft 55. The bearing 72B is formed in such a shape as to have a projection 81. The projection 81 protrudes toward the shaft 55 from a portion close to the motor 35, in the axial direction of the shaft 55. Further, the projection 81 has an opening 83 formed at a leading end, in the protruding direction, of projection 81. Thus, the bearing 72B is configured to support the rear end portion of the shaft 55 inserted into an inner circumferential side of the projection 81 through the opening 83. In the illustrative embodiment, as shown in FIGS. 4 and 5, there is a bush 73 between the bearing 72B and the shaft 55. The projection 81 is disposed in such a position that a leading end portion 81A, in the protruding direction, of the projection 81 overlaps the sheet conveyance path in a view in a direction perpendicular to the protruding direction of the projection 81. It is noted that a plurality of interpretations may be considered as the definition "the leading end portion 81A of the projection 81 overlaps the sheet conveyance path." For instance, each of the first guide member 46 and the second guide member 47 has a surface (hereinafter referred to as a conveyance surface) that faces a sheet being conveyed thereon. In general, an apparatus of this kind includes side walls that are disposed at two ends of a conveyance surface in a width direction of a sheet, respectively, and extend in a direction perpendicular to the conveyance surface. Namely, the sheet is conveyed along and passes through a sheet conveyance path defined by the conveyance surface and the side walls. In this case, when the leading end portion 81A of the projection 81 protrudes toward the sheet conveyance path from one of the two side walls, it may be interpreted as "the leading end portion 81A of the projection 81 overlapping the sheet conveyance path." Further, in the apparatus of this kind, a maximum width of sheets conveyable by the apparatus is previously determined. In this case, a range through which the sheets of the maximum width pass may be defined as the sheet conveyance path. Namely, when the leading end portion 81A of the projection 81 is at least partially within the range through which the sheets of the maximum width pass, it may be interpreted as "the leading end portion 81A of the projection 81 overlapping the sheet conveyance path."

The second guide member 47 is disposed very close to the bearing 72B. However, as shown in FIG. 3, the second guide member 47 includes a cutout portion 75, and the bearing 72B is partially put inside the cutout portion 75. Therefore, although the bearing 72B is disposed in such a position as above, it is possible to dispose the second guide member 47 sufficiently close to the first guide member 46. Accordingly, it is possible to thin a multi-layer structure that the second guide member 47 is placed above the first guide member 46. Thus, it is possible to make the ADF section 5 thinner than when the aforementioned thinned multi-layer structure of the two guide members 46 and 47 is not employed.

As shown in FIG. 5, there is a gear 43A attached between two ends of the shaft 52 in an axial direction of the shaft 52. In addition, there is a gear 43B attached to a rear end portion of the shaft 51. Further, there is a gear 43C disposed between the gears 43A and 43B. The gears 43A, 43B, and 43C are included in the third power transmission unit 43. When the first power transmission unit 41 operates in response to the operation of the motor 35, and the shaft 52 is driven to rotate, the third power transmission unit 43 operates, and the shaft 51 is driven to rotate.

Advantageous Effects

According to the MFP 1 as described above, in the ADF section 5, the motor 35 and the shaft 55 are disposed not to overlap each other in the axial direction of the shaft 55 (i.e., not overlap each other in a view in a direction perpendicular to the axial direction of the shaft 55) and disposed to overlap each other in a view in the axial direction of the shaft 55. Therefore, in the view in the axial direction of the shaft 55, there is no need to secure a space for disposing the shaft 55 around the motor 35, unlike when an equivalent of the motor 35 and an equivalent of the shaft 55 are disposed to overlap each other in an axial direction of the equivalent of the shaft 55 and not overlap each other in a view in the axial direction of the equivalent of the shaft 55. Therefore, it is possible to achieve miniaturization of the ADF section 5.

Further, according to the aforementioned ADF section 5, in the bearing 72B closer to the motor 35 (than the bearing 72A), the projection 81 is disposed in such a position that the leading end portion 81A, in the protruding direction, of the projection 81 overlaps the sheet conveyance path in a view in a direction perpendicular to the protruding direction of the projection 81 (e.g., in a top view or a bottom view). Therefore, it is possible to make shorter a length of the shaft 55 in the axial direction of the shaft 55 and/or a distance between the bearings 72A and 72B, than when an equivalent of the projection 81 is disposed not to overlap the sheet conveyance path in a view in a direction perpendicular to a protruding direction of the equivalent of the projection 81. Accordingly, although the motor 35 and the shaft 55 are disposed in such positions as described above, it is possible to dispose the motor 35 closer to the sheet conveyance path in comparison with a known configuration. Thereby, it is possible to achieve miniaturization of the ADF section 5 as a whole.

Further, according to the aforementioned ADF section 5, the bearing 72B is formed integrally with the first guide member 46. Therefore, it is possible to make the number of components and assembling man-hours less than when a bearing is provided as a body separate from the first guide member 46.

Further, according to the aforementioned ADF section 5, the bearing 72B is partially put inside the cutout portion 75 formed at the second guide member 47. Therefore, it is possible to dispose the first guide member 46 and the second guide member 47 closer to each other, in comparison with when there is not an equivalent of the cutout portion 75 formed at an equivalent of the second guide member 47 or when an equivalent of the bearing 72B is not put inside the equivalent of the cutout portion 75. Thus, according to the illustrative embodiment, it is possible to achieve miniaturization of the ADF 5 as a whole.

Further, according to the aforementioned ADF section 5, a driving force from the motor 35 is transmitted to the shaft 55 via the first power transmission unit 41, the shaft 54, and the second power transmission unit 42. Accordingly, although the motor 35 and the shaft 55 are disposed apart from each other in the axial direction of the shaft 55, the driving force is adequately transmitted from the motor 35 to the shaft 55, and thereby, the shaft 55 and the discharge roller 15A are driven to rotate. Further, the first power transmission unit 41 and the second power transmission unit 42 are disposed to overlap each other in a view in the axial direction of the shafts 54 and 55. Hence, it is possible to make a region for laying out the first power transmission unit 41 and the second power transmission unit 42 smaller than when an equivalent of the first power transmission unit 41 and an equivalent of the second power transmission unit 42 are disposed not to overlap each other in a view in the axial direction of the shafts 54 and 55. Thus, it is possible to achieve miniaturization of the ADF section 5.

Further, according to the aforementioned ADF section 5, the second power transmission unit 42 is configured to transmit a driving force from the shaft 54 to the shaft 55, using the toothed belt 42C. Therefore, it is possible to make the configuration of the second power transmission unit 42 simpler than when a lot of gears form an equivalent of the second power transmission unit 42. Further, the shaft 55 is driven to rotate by the toothed belt 42C, in the same rotational direction as the shaft 54. Therefore, there is no need to crisscross the toothed belt 42C to be wound around the gears 42A and 42B. Thus, it is possible to reduce a load placed on the toothed belt 42C.

Further, according to the aforementioned ADF section 5, the supporting wall 60 is formed in such a shape that the third portion 61C and the fourth portion 62A are recessed toward the sheet conveyance path from the first portion 61A and the sixth portion 62C. Then, at the recessed portion (i.e., the third portion 61C and the fourth portion 62A), a part of elements (such as the gears 41D and 41E) included in the first power transmission unit 41 is attached. Further, at one portion (the first portion 61A) of two portions adjacent to two ends of the recessed portion in the left-to-right direction, the motor 35 is attached. Furthermore, by the other portion (the sixth portion 62C) of the two portions adjacent to two ends of the recessed portion in the left-to-right direction, an end portion of the shaft 54 is supported.

Therefore, unlike an equivalent of the supporting wall 60 formed in a flat plate shape, it is possible to put, to the sheet conveyance path, a region for disposing a part (such as the gears 41D and 41E) of the first power transmission unit 41. Thus, it is possible to reduce a length, in the axial direction of the shaft 55, of a region occupied by the motor 35 and the first power transmission unit 41.

Moreover, to form the supporting wall 60, the first sheet metal member 61 including the first to third portions 61A, 61B, and 61C and the second sheet metal member 62 including the fourth to sixth portions 62A, 62B, and 62C are used. Therefore, it is possible to more easily form, in a press forming method, the supporting wall 60 in a complicated shape including the first to sixth portions 61A, 61B, 61C, 62A, 62B, and 62C (more specifically, in such a shape that the third portion 61C and the fourth portion 62A are recessed toward the sheet conveyance path from the first portion 61A and the sixth portion 62C), in comparison with forming the supporting wall 60 from a single sheet metal member. Thus, it is possible to prevent strains caused in the first sheet metal member 61 or the second sheet metal member 62.

Further, according to the aforementioned ADF section 5, the discharge roller 15A is configured to receive the driving force transmitted from the motor 35 via the first power transmission unit 41 and the second power transmission unit 42. It might cause some delay in transmission of the driving force to the discharge roller 15A, in comparison with a configuration that the discharge roller 15A receives the driving force in a position closer to the motor 35 than the position exemplified in the illustrative embodiment. However, the discharge roller 15A is the most downstream one of rollers disposed along the sheet conveyance path of the ADF section 5, and is a roller for conveying a sheet for which image reading has been completed by the first image sensor 31A and the second image sensor 31B. Hence, even though some delay is caused in transmitting the driving force to the discharge roller 15A, it does not have any negative influence on the quality level of the read images. Thus, the discharge roller 15A is configured in such a preferable manner that the shaft 55 of the discharge roller 15A is disposed to overlap the motor 35 in a view in the axial direction of the shaft 55 and spaced apart from the motor 35 in the axial direction of the shaft 55.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein.

MODIFICATION

In the aforementioned illustrative embodiment, aspects of the present disclosure are applied to the MFP 1 including the reading unit 3 and the ADF section 5. For instance, however, aspects of the present disclosure may be applied to a single-function image scanner.

What is claimed is:

1. A sheet feeder comprising:
   a motor;
   a first shaft configured to be driven to rotate by a driving force from the motor, the first shaft being spaced apart from the motor in an axial direction of the first shaft, the first shaft being disposed to overlap the motor when viewed in the axial direction of the first shaft;
   a first roller supported by the first shaft and rotatable along with the first shaft, the first roller being configured to convey the sheet downstream in a sheet conveyance direction along a sheet conveyance path; and
   bearings configured to rotatably support two end portions of the first shaft in the axial direction of the first shaft,
   wherein the bearings comprise a first bearing and a second bearing, the second bearing being disposed closer to the motor than the first bearing,
   wherein the second bearing comprises a projection that protrudes in a protruding direction toward the first shaft from a portion close to the motor,
   wherein the projection has an opening formed at a leading end of the projection in the protruding direction,
   wherein the second bearing is configured to support an end portion of the first shaft inserted into an inner circumferential side of the projection through the opening, and
   wherein the projection is disposed to overlap the sheet conveyance path in a view in a direction perpendicular to the protruding direction of the projection.

2. The sheet feeder according to claim 1, further comprising:
   a base member;
   a second shaft configured to be driven to rotate by the driving force from the motor;
   a second roller supported by the second shaft and rotatable along with the second shaft, the second roller being configured to convey the sheet downstream in the sheet conveyance direction along the sheet conveyance path; and
   a first guide member attached to the base member, the first guide member being configured to define a first conveyance path of the sheet conveyance path between the first guide member and the base member, the first conveyance path leading to the first roller from the second roller,
   wherein the second bearing is formed integrally with the first guide member.

3. The sheet feeder according to claim 2, further comprising a second guide member opposed to the first conveyance path across the first guide member,
   wherein the second guide member is configured to define a second conveyance path of the sheet conveyance path between the second guide member and one or more members opposed to the first guide member across the second guide member, the second conveyance path leading to the second roller from upstream relative to the second roller in the sheet conveyance direction,
   wherein the second guide member has one of a hole and a cutout, and
   wherein the second bearing is at least partially put inside the one of the hole and the cutout.

4. The sheet feeder according to claim 2, further comprising:
   a first power transmission unit configured to transmit the driving force from the motor to an end portion of the second shaft and rotate the second shaft; and
   a second power transmission unit configured to transmit the driving force from another end portion of the second shaft to another end portion of the first shaft and rotate the first shaft.

5. The sheet feeder according to claim 4,
   wherein the first power transmission unit and the second power transmission unit are disposed to overlap each other in a view in the axial direction of the first shaft and an axial direction of the second shaft.

6. The sheet feeder according to claim 4,
   wherein the second power transmission unit comprises an endless belt wound around the first shaft and the second shaft.

7. The sheet feeder according to claim 6,
   wherein the first shaft is driven to rotate in a same rotational direction as the second shaft, by the endless belt.

8. The sheet feeder according to claim 4, further comprising a supporting wall configured to support the motor, one or more members included in the first power transmission unit, and the end portion of the second shaft,
   wherein the supporting wall comprises:
      a first sheet metal member; and
      a second sheet metal member separate from the first sheet metal,
   wherein the first sheet metal member comprises:
      a first portion disposed parallel to the sheet conveyance path in a state where a thickness direction of the first portion is oriented in a same direction as the axial direction of the first shaft;
      a second portion that is bent from an end of the first portion and extends in such a direction as to approach the sheet conveyance path; and
      a third portion that is bent from an end of the second portion and disposed parallel to the sheet conveyance path in a position closer to the sheet conveyance path than the first portion,
   wherein the second sheet metal member comprises:
      a fourth portion disposed parallel to the sheet conveyance path in a state where a thickness direction of the fourth portion is oriented in the same direction as the axial direction of the first shaft, the fourth portion being in contact with the third portion in the thickness direction of the fourth portion;

a fifth portion that is bent from an end of the fourth portion and extends in such a direction as to become farther from the sheet conveyance path; and a sixth portion that is bent from an end of the fifth portion and disposed parallel to the sheet conveyance path in a position farther from the sheet conveyance path than the fourth portion, wherein the motor is attached onto a first-side surface of the first portion that faces the sheet conveyance path, wherein one or more members included in the first power transmission unit are attached onto a second-side surface of at least one of the third portion and the fourth portion, the second-side surface being opposite to a first-side surface, facing the sheet conveyance path, of the at least one of the third portion and the fourth portion, and wherein the end portion of the second shaft is supported by the sixth portion.

9. The sheet feeder according to claim 1,
wherein the first roller is a discharge roller configured to discharge the sheet toward a downstream end portion of the sheet conveyance path.

10. The sheet feeder according to claim 2,
wherein the second roller is a turn-around roller configured to convey the sheet along an outer circumferential surface of the turn-around roller and turn around the sheet conveyance direction.

11. An image reader comprising:
an image sensor configured to read an image on a sheet in a reading position; and
a sheet feeder configured to feed the sheet to the reading position and discharge the sheet on which the image has been read by the image sensor, the sheet feeder comprising:
a motor;
a first shaft configured to be driven to rotate by a driving force from the motor, the first shaft being spaced apart from the motor in an axial direction of the first shaft, the first shaft being disposed to overlap the motor in a view in the axial direction of the first shaft; and
a first roller supported by the first shaft and rotatable along with the first shaft, the first roller being configured to convey the sheet downstream in a sheet conveyance direction along a sheet conveyance path;
wherein the sheet feeder further comprises bearings configured to rotatably support two end portions of the first shaft in the axial direction of the first shaft,
wherein the bearings comprise a first bearing and a second bearing, the second bearing being disposed closer to the motor than the first bearing,
wherein the second bearing comprises a projection that protrudes in a protruding direction toward the first shaft from a portion close to the motor,
wherein the projection has an opening formed at a leading end of the projection in the protruding direction,
wherein the second bearing is configured to support an end portion of the first shaft inserted into an inner circumferential side of the projection through the opening, and
wherein the projection is disposed to overlap the sheet conveyance path in a view in a direction perpendicular to the protruding direction of the projection.

12. The image reader according to claim 11,
wherein the first roller is disposed downstream relative to the reading position in the sheet conveyance direction.

13. The image reader according to claim 11,
wherein the sheet feeder further comprises:
a base member;
a second shaft configured to be driven to rotate by the driving force from the motor;
a second roller supported by the second shaft and rotatable along with the second shaft, the second roller being configured to convey the sheet downstream in the sheet conveyance direction along the sheet conveyance path; and
a first guide member attached to the base member, the first guide member being configured to define a first conveyance path of the sheet conveyance path between the first guide member and the base member, the first conveyance path leading to the first roller from the second roller, and
wherein the second bearing is formed integrally with the first guide member.

14. The image reader according to claim 13,
wherein the sheet feeder further comprises a second guide member opposed to the first conveyance path across the first guide member,
wherein the second guide member is configured to define a second conveyance path of the sheet conveyance path between the second guide member and one or more members opposed to the first guide member across the second guide member, the second conveyance path leading to the second roller from upstream relative to the second roller in the sheet conveyance direction,
wherein the second guide member has one of a hole and a cutout, and
wherein the second bearing is at least partially put inside the one of the hole and the cutout.

15. The image reader according to claim 13,
wherein the sheet feeder further comprises:
a first power transmission unit configured to transmit the driving force from the motor to an end portion of the second shaft and rotate the second shaft; and
a second power transmission unit configured to transmit the driving force from another end portion of the second shaft to another end portion of the first shaft and rotate the first shaft.

16. The image reader according to claim 15,
wherein the first power transmission unit and the second power transmission unit are disposed to overlap each other in a view in the axial direction of the first shaft and an axial direction of the second shaft.

17. The image reader according to claim 15,
wherein the second power transmission unit comprises an endless belt wound around the first shaft and the second shaft.

18. The image reader according to claim 15,
wherein the sheet feeder further comprises a supporting wall configured to support the motor, one or more members included in the first power transmission unit, and the end portion of the second shaft,
wherein the supporting wall comprises:
a first sheet metal member; and
a second sheet metal member separate from the first sheet metal,
wherein the first sheet metal member comprises:
a first portion disposed parallel to the sheet conveyance path in a state where a thickness direction of the first portion is oriented in a same direction as the axial direction of the first shaft;

a second portion that is bent from an end of the first portion and extends in such a direction as to approach the sheet conveyance path; and a third portion that is bent from an end of the second portion and disposed parallel to the sheet conveyance path in a position closer to the sheet conveyance path than the first portion, wherein the second sheet metal member comprises:

a fourth portion disposed parallel to the sheet conveyance path in a state where a thickness direction of the fourth portion is oriented in the same direction as the axial direction of the first shaft, the fourth portion being in contact with the third portion in the thickness direction of the fourth portion;

a fifth portion that is bent from an end of the fourth portion and extends in such a direction as to become farther from the sheet conveyance path; and a sixth portion that is bent from an end of the fifth portion and disposed parallel to the sheet conveyance path in a position farther from the sheet conveyance path than the fourth portion, wherein the motor is attached onto a first-side surface of the first portion that faces the sheet conveyance path, wherein one or more members included in the first power transmission unit are attached onto a second-side surface of at least one of the third portion and the fourth portion, the second-side surface being opposite to a first-side surface, facing the sheet conveyance path, of the at least one of the third portion and the fourth portion, and wherein the end portion of the second shaft is supported by the sixth portion.

\* \* \* \* \*